(12) United States Patent
Sunde et al.

(10) Patent No.: US 12,379,024 B1
(45) Date of Patent: Aug. 5, 2025

(54) VENT DEVICE

(71) Applicant: Ford Global Technologies, LLC, Dearborn, MI (US)

(72) Inventors: Robert Sunde, Macomb, MI (US); Emad Al-Regib, Canton, MI (US); Niaz Khwaja, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/653,602

(22) Filed: May 2, 2024

(51) Int. Cl.
*F16H 57/02* (2012.01)
*F16H 57/027* (2012.01)

(52) U.S. Cl.
CPC ................. *F16H 57/027* (2013.01)

(58) Field of Classification Search
CPC .................. F16H 57/027; F16H 57/0416
See application file for complete search history.

(56) References Cited

U.S. PATENT DOCUMENTS

| | | | | |
|---|---|---|---|---|
| 2,314,963 A * | 3/1943 | Zelnis | .................. | F24D 19/087 220/373 |
| 4,284,096 A * | 8/1981 | Leonard | .............. | F16H 61/0283 475/136 |
| 7,517,392 B2 * | 4/2009 | Neff | ........................ | F16K 17/19 55/444 |
| 7,766,034 B2 | 8/2010 | Talaski | | |
| 10,948,068 B2 * | 3/2021 | Tesner | .................. | F16H 57/027 |
| 2003/0010151 A1 * | 1/2003 | Johnson | .................. | F16H 57/04 74/606 R |
| 2010/0032242 A1 * | 2/2010 | Lin | ........................ | F01M 13/00 184/6.12 |
| 2018/0029864 A1 | 2/2018 | Blackburn | | |
| 2022/0200079 A1 | 6/2022 | Boddakayala et al. | | |

FOREIGN PATENT DOCUMENTS

| | | | | |
|---|---|---|---|---|
| CN | 107740857 A | * | 2/2018 | |
| CN | 110345287 A | * | 10/2019 | |
| CN | 111120634 A | * | 5/2020 | ........... F16H 57/027 |
| CN | 111734862 A | * | 10/2020 | ............ B01D 46/00 |
| CN | 112816160 A | | 5/2021 | |
| CN | 114904109 A | | 8/2022 | |
| CN | 116447306 A | * | 7/2023 | |
| DE | 3932118 A1 | * | 4/1991 | |
| DE | 202010009634 U1 | | 9/2010 | |
| DE | 202011104284 U1 | | 11/2011 | |
| DE | 102010026308 A1 | | 1/2012 | |
| DE | 102011109164 A1 | | 2/2013 | |
| DE | 102011120002 A1 | | 5/2013 | |

(Continued)

OTHER PUBLICATIONS

Machine translation of DE 3932118 A1 obtained on Jan. 17, 2025.*
Machine translation of CN 110345287 A obtained on Jan. 17, 2025.*

*Primary Examiner* — Adam D Rogers
(74) *Attorney, Agent, or Firm* — David Kelley; McCoy Russell LLP (57) ABSTRACT

Methods and systems are provided for a vent device. In one example, a system includes a vent device including a body that extends through a housing, wherein a spherical flow element is arranged in the body adjacent to a cap through which gases flow. The cap includes openings between it and the body that allow gases to vent to an ambient atmosphere.

17 Claims, 6 Drawing Sheets

(56) References Cited

FOREIGN PATENT DOCUMENTS

| | | | |
|---|---|---|---|
| DE | 202016004440 U1 | * | 11/2017 |
| DE | 202018000709 U1 | | 3/2018 |
| DE | 102020114690 A1 | * | 12/2021 |
| KR | 970075507 A | * | 12/1997 |
| KR | 19980013109 U | * | 6/1998 |
| KR | 200210441 Y1 | * | 3/2001 |
| KR | 20100027087 A | | 3/2010 |
| KR | 20140094482 A | | 7/2014 |

* cited by examiner

VENT DEVICE

FIELD

The present description relates generally to a vent device for a transmission.

BACKGROUND/SUMMARY

Vehicle powertrains may include components that demand lubricant to improve efficiency and longevity of the elements thereof. Internal pressures of these components may increase due to vehicle operating conditions and/or ambient conditions. Thus, a demand for controlled ventilation of these components exists.

Some vent devices may include a metal spigot pressed or threaded onto a housing of the component, such as a transmission of the vehicle powertrain. Hoses may be used to allow the vent to expel gases above a fill line of the component. Examples that omit the hoses and use a membrane or other flexible element may experience challenges due to water intrusion.

In one example, the issues described above may be addressed by a system including a vent device comprising a body that extends through a housing, wherein a spherical flow element is arranged in the body adjacent to a cap through which gas flows. In this way, the spherical element may enhance ventilation of a transmission to maintain a threshold pressure thereof.

As one example, the vent device may include plastic materials. The vent device may be threaded onto the housing via a portion of the body. By doing this, installation and operation of the vent device may be enhanced relative to the previous examples described above.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2A:
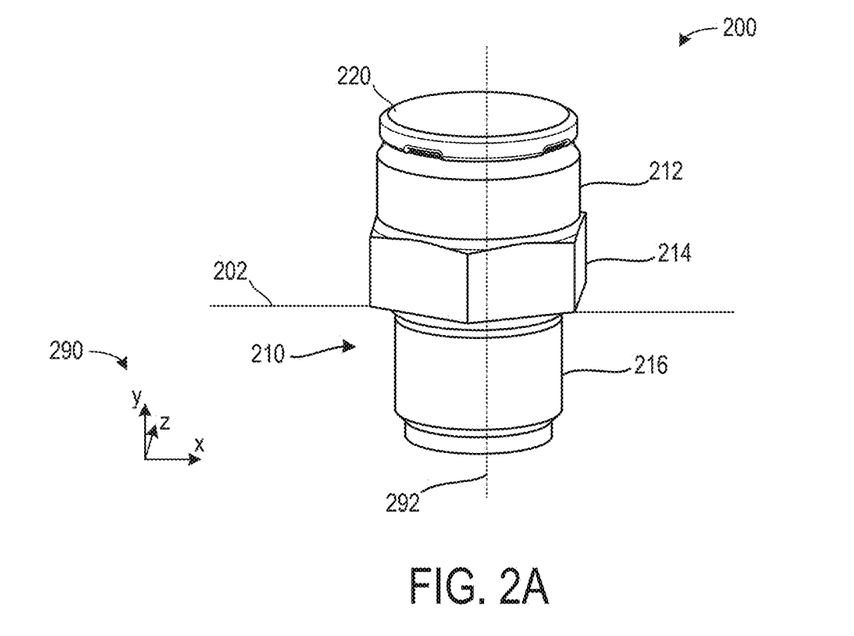
FIG. 2A shows a perspective view of a vent device.
Figure 2B:
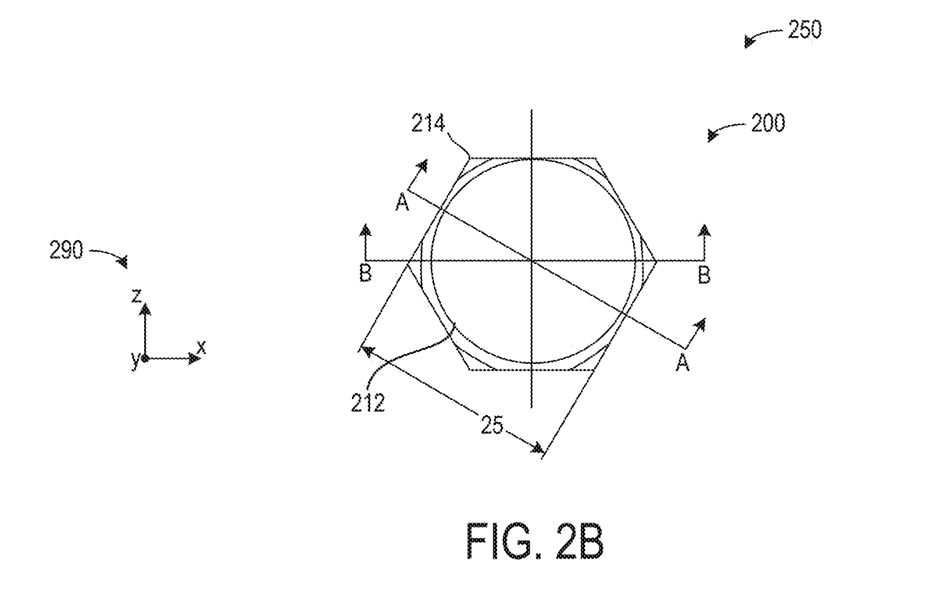
FIG. 2B shows a top-down view of the vent device.
Figure 3:
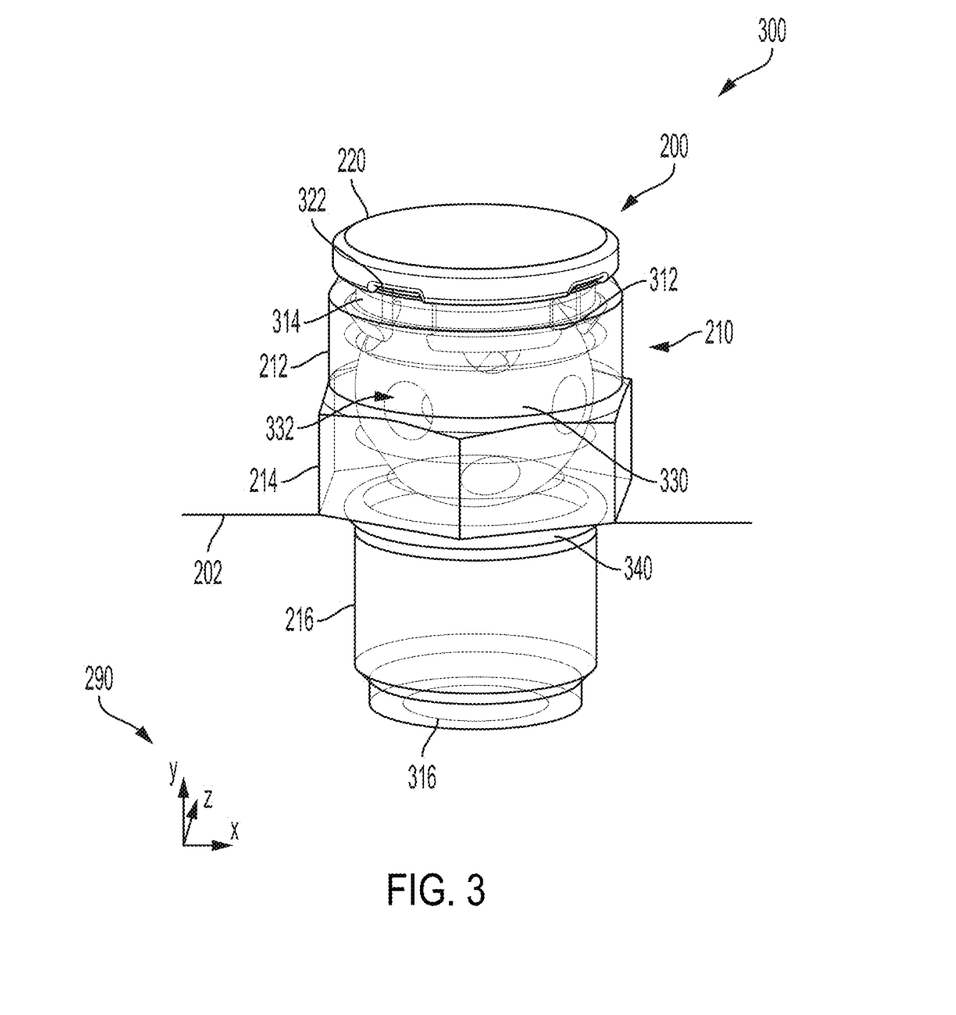
FIG. 3 shows an interior of the vent device.
Figure 4A:
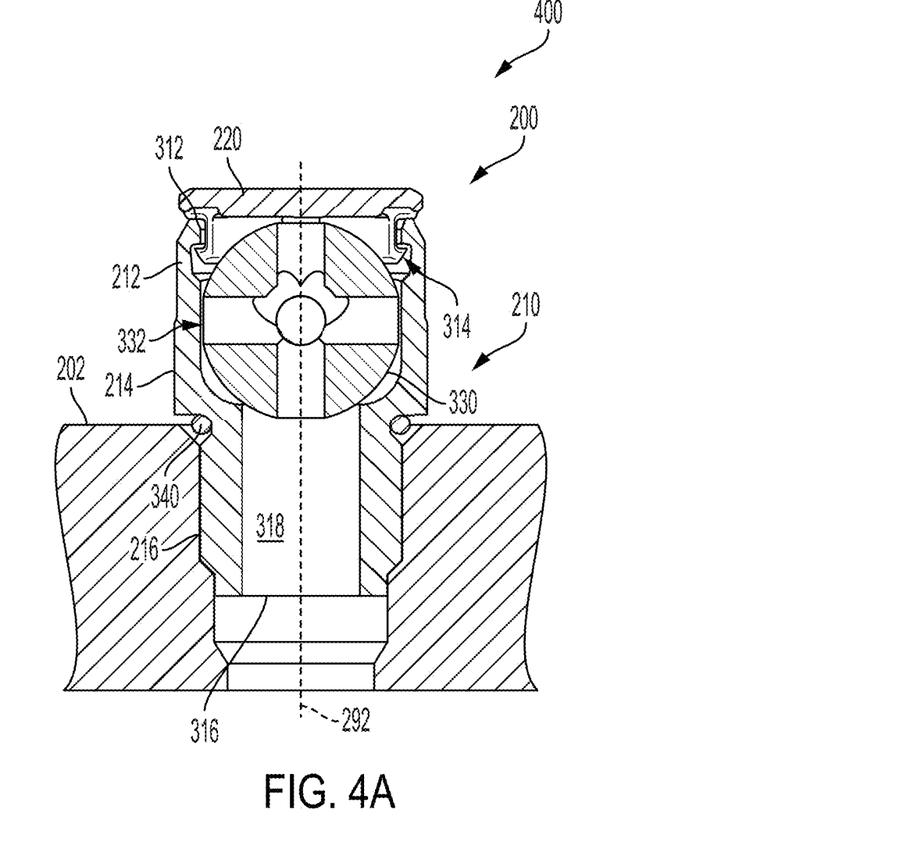
FIG. 4A shows a first cross-section of the vent device taken along cutting plane A-A of FIG. 2B.
Figure 4B:
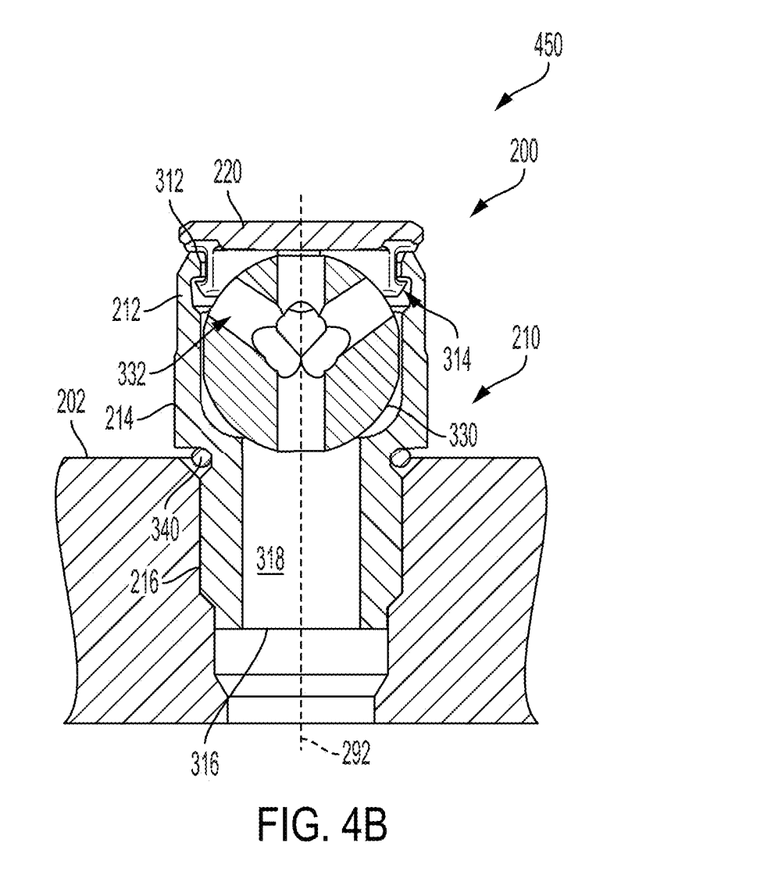
FIG. 4B shows a second cross-section of the vent device taken along cutting plane B-B of FIG. 2B.
Figure 5A:
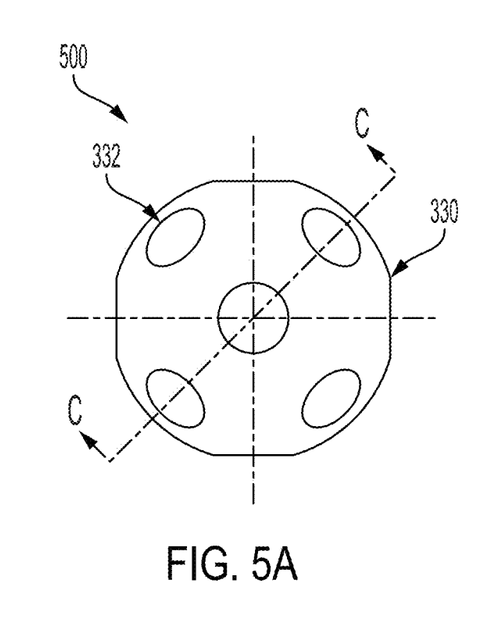
FIG. 5A shows a view of a ball valve of the vent device.
Figure 5B:
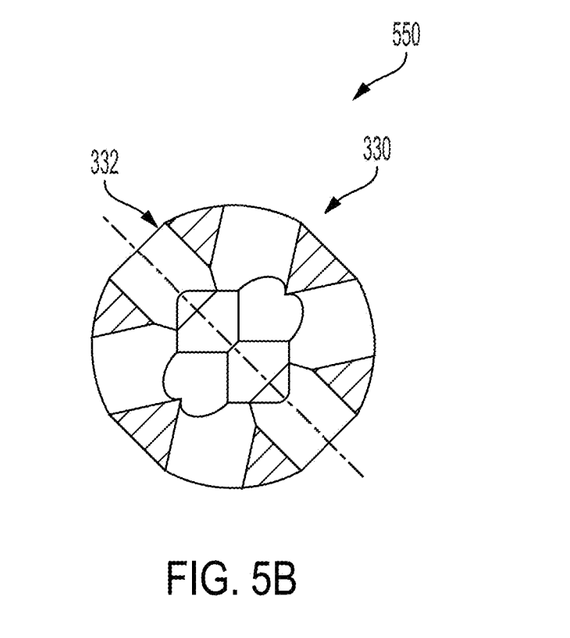
FIG. 5B shows a cross-section of the ball valve taken along cutting plane C-C of FIG. 5A.

The following description relates to systems for a vent device. The vent device may be arranged in a transmission (e.g., a gearbox) of a vehicle system, such as the vehicle system shown in FIG. 1. FIG. 2A shows a perspective view of a vent device. FIG. 2B shows a top-down view of the vent device. FIG. 3 shows an interior of the vent device. FIG. 4A shows a first cross-section of the vent device taken along cutting plane A-A of FIG. 2B. FIG. 4B shows a second cross-section of the vent device taken along cutting plane B-B of FIG. 2B. FIG. 5A shows a view of a ball valve of the vent device. FIG. 5B shows a cross-section of the ball valve taken along cutting plane C-C of FIG. 5A.

Figure 1:
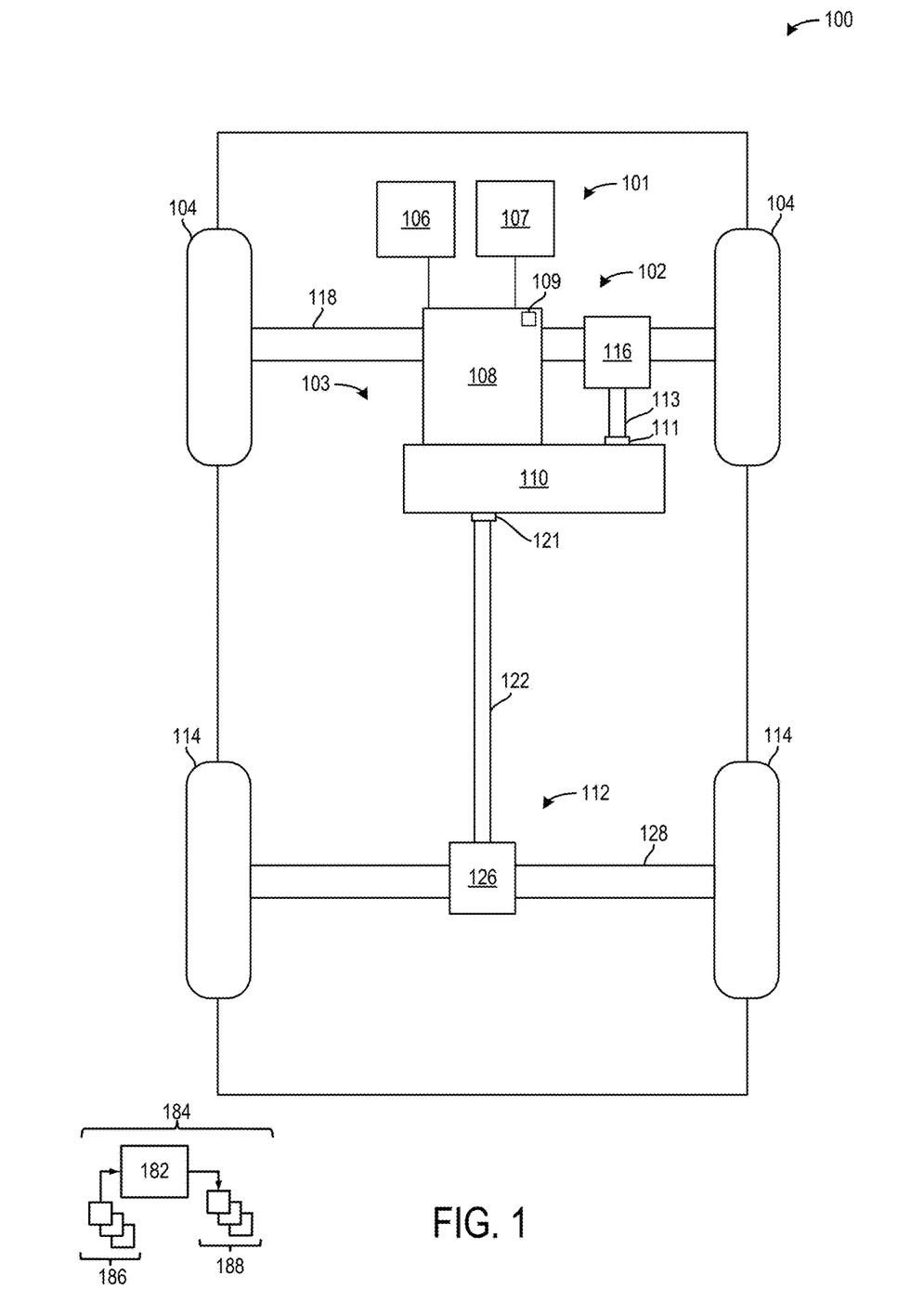
FIG. 1 shows an example of a vehicle system.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. The transmission 108 may include a vent device 109 coupled to a fitting of a housing of the transmission 108. The transmission 108 may be an automatic transmission coupled to an internal combustion engine or a power unit coupled to an electric motor.

In one example, the prime mover 106 is a first prime mover 106 and the vehicle 100 may further include a second prime mover 107. The first prime mover 106 may be different than the second prime mover 107. For example, the first prime mover 106 may be an electric machine and the second prime mover 107 may be an internal combustion engine. Additionally or alternatively, the first prime mover 106 and the second prime mover 107 may both be an electric motor or an internal combustion engine, however, a size and/or a fuel source thereof may be different between the first and second prime movers. In some examples, additionally or alternatively, if one of the first prime mover 106 and the second prime mover 107 is an engine, the engine may be configured to combust multiple fuels including varying amounts of carbon and carbon-free fuels.

Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation. In one example, the first prime mover 106 is an electric machine and the second prime mover 107 is an internal combustion engine.

The vehicle 100 may be a commercial vehicle, light, medium, or heavy duty vehicle, a passenger vehicle, an off-highway vehicle, a locomotive, and a sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both the engine and the electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

FIG. 2A shows an example of a vent device 200. The vent device 200 may be a non-limiting example of vent device 109 of FIG. 1 and arranged in a transmission, such as transmission 108 of FIG. 1. The vent device 200 may include plastic materials. The vent device 200 may be free of a membrane, a diaphragm, or other element configured to expand and contract in response to pressure. The vent device 200 may be directly coupled to a casing (e.g., a housing) of the transmission.

An axis system 290 is shown comprising three axes, namely an x-axis parallel to a lateral direction, a y-axis parallel to an axial direction, and a z-axis parallel to a transverse direction. The axes are normal to one another. A central axis 292 is shown via a dashed line. The central axis 292 is parallel to the y-axis.

The vent device 200 may be in face-sharing contact with a transmission housing 202. The vent device 200 may include a body 210. The body 210 may be a single piece. The body 210 may include three portions, including an upper portion 212, a middle portion 214, and a lower portion 216. The upper portion 212 and the lower portion 216 may include a cylindrical shape. The middle portion 214 may include a hexagonal cross-sectional shape. The middle portion 214 may include other non-circular cross-sectional shapes without departing from the scope of the present disclosure. In one example, only the lower portion 216 may extend into the transmission housing 202 and the middle portion 214 and the upper portion 212 are arranged in an environment outside the transmission housing 202 (e.g., an ambient atmosphere). The middle portion 214 may be in face-sharing contact with the housing 202 at an interface between the middle portion 214 and the lower portion 216. The upper portion 212 is arranged outside transmission housing 202 between the middle portion 214 and a cap 220. The upper portion 212 and the cap 220 may include a first diameter. The lower portion 216 may include a second diameter smaller than the first diameter.

Turning now to FIG. 2B, it shows a top-down view 250 of the vent device 200. As illustrated, a size of the middle portion 214 is larger than a size of the upper portion 212. The middle portion 214 may include a hexagonal shape. In one example, a socket, a wrench, or other tool may engage with the middle portion 214 and tighten the vent device 200 to the transmission housing 202.

Turning now to FIG. 3, it shows a view 300 illustrating an interior volume of the vent device 200. The lower portion 216 may include an opening 316 that fluidly couples the interior volume to an interior of the transmission housing 202. The opening 316 may allow gases, such as air, to flow/be directed/be forced from an interior of the transmission housing 202 to an interior passage 318 (as shown in FIG. 4A). The interior passage 318 may extend through each of the lower portion 216, the middle portion 214, and the upper portion 212. In this way, the body 210 may be hollow.

A flow element 330 may be arranged in the interior volume of the middle portion 214 and the upper portion 212. As such, the flow element 330 may be arranged above a boundary of the transmission housing 202. The flow element 330 is a sphere, in one example. Additionally or alternatively, the flow element 330 may include other shapes, such as a cube, a pyramid, an egg shape, or other three-dimensional shape.

The flow element 330 may include a plurality of passages 332 extending therethrough. Each of the plurality of passages 332 may extend through an entire width (e.g., diameter) of the flow element 330. The plurality of passages 332 may intersect with one another at a geometric center of the flow element 330.

In one example, the flow element 330 is a spherical flow element including the plurality of passages 332, wherein each of the plurality of passages is angularly arranged. A spacing between each of the plurality of passages may be uniform such that the spherical flow element and the plurality of passages are symmetric.

The cap 220 may include a plurality of openings 322 arranged around a circumference thereof. The plurality of openings 322 may interrupt a seal between the cap 220 and the upper portion 212. The plurality of openings 322 may be configured to direct gases from the interior volume of the vent device 200 to an ambient atmosphere (e.g., outside the transmission housing).

As illustrated in the example of FIG. 3, the cap 220 may be retained within the upper portion 212 via a plurality of snap rings 314. The plurality of snap rings 314 may engage with a lip 312 of the upper section 212. The plurality of snap rings 314 may be configured to resist forces parallel to the y-axis such that gases flowing through the vent device 200 may not remove the cap 220 from the vent device 200.

The plurality of snap rings 314 may include a J-shape or other hook shape. The plurality of snap rings 314 may be flexible in an x-z plane. The plurality of snap rings 314 may flex radially inward as the cap 220 is pressed onto the vent device 200. Once the plurality of snap rings 314 extend beyond the lip 312, the plurality of snap rings 314 may extend radially outward back to a resting position and engage with the lip 312.

An elastomeric ring 340 may be arranged adjacent to an interface between the middle portion 214 and the lower portion 216. In one example, the elastomeric ring 340 is pressed against surfaces of the middle portion 214 and the transmission housing 202 to block gas flow from escaping through an interface between the middle portion 214 and the transmission housing 202. In one example, the elastomeric ring 340 is a rubber O-ring.

Turning now to FIG. 4A, it shows a first cross-sectional embodiment 400 of the vent device 200 based on the cutting plane A-A of FIG. 2B. The first cross-sectional embodiment 400 reveals the interior passage 318 of the vent device 200 and the plurality of passages 332 of the flow element 330. As illustrated, the plurality of passages 332 may extend at 45 and 90 degree angles relative to one another. A size and shape of the plurality of passages 332 may be based on a flow demand of the transmission.

Turning now to FIG. 4B, it shows a second cross-sectional embodiment 450 of the vent device based on the cutting plane B-B of FIG. 2B. The second cross-sectional embodiment 450 reveals passages of the plurality of passages 332 arranged at 45 degree angles relative to other passages of the plurality of passages 332. In one example, at least one passage is parallel to the central axis 292 and another passage is normal to the central axis 292. The other passages of the plurality of passages 332 may be angled 45 degrees relative to the central axis 292.

Gas flowing through the interior passage 318 may be forced to flow through the plurality of passages 332 of the flow element 330 prior to flowing through openings arranged between the cap 220 and the body 210. In one example, the gas is air. The shape and orientation of the flow element 330 may restrict lubricant from flowing through the vent device 200 to an ambient atmosphere.

Turning now to FIG. 5A, it shows a perspective view 500 of the flow element 330. A cutting plane C-C of the flow element 330 is shown in a third cross-sectional view 550 of FIG. 5B. As illustrated, the flow element 330 may include exactly five passages of the plurality of passages 332. The plurality of passages 332 may intersect at a geometric center of the flow element 330. By doing this, backflow in the flow element 330 may be reduced.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2A-5B are shown approximately to scale. Other relative dimensions may be used if desired.

The disclosure also provides support for a system, comprising: a vent device comprising a body that extends through a housing, wherein a spherical flow element is arranged in the body adjacent to a cap through which gases flow. In a first example of the system, the body comprises an upper portion, a middle portion, and a lower portion, wherein the upper portion and the lower portion are cylindrical, and wherein the middle portion comprises a hexagonal cross-sectional shape. In a second example of the system, optionally including the first example, a diameter of the upper portion is greater than a diameter of the lower portion. In a third example of the system, optionally including one or both of the first and second examples, the middle portion is in face-sharing contact with the housing. In a fourth example of the system, optionally including one or more or each of the first through third examples, the spherical flow element extends from the middle portion to the cap. In a fifth example of the system, optionally including one or more or each of the first through fourth examples, the spherical flow element comprises a plurality of passages. In a sixth example of the system, optionally including one or more or each of the first through fifth examples, the plurality of passages is angled 45 and 90 degrees to a central axis of the vent device. In a seventh example of the system, optionally including one or more or each of the first through sixth examples, the plurality of passages intersects at a geometric center of the spherical flow device. In an eighth example of the system, optionally including one or more or each of the first through seventh examples, the housing is a transmission housing.

The disclosure also provides support for a vent device, comprising: a cap, a body comprising an upper portion, a middle portion, and a lower portion, wherein the upper portion and the lower portion are cylindrical, and wherein the middle portion comprises a non-circular cross-sectional shape, and a spherical flow element arranged in the upper portion and the middle portion of the body, the spherical element comprising a plurality of passages. In a first example of the system, the body comprises an interior passage that extends through each of the upper portion, the middle portion, and the lower portion, and wherein gases flowing through the interior passage are forced to flow through the plurality of passages of the spherical flow element prior to flowing through the cap. In a second example of the system, optionally including the first example, the body is a single piece. In a third example of the system, optionally including one or both of the first and second examples, a diameter of the upper portion is greater than a diameter of the lower portion. In a fourth example of the system, optionally including one or more or each of the first through third examples, the non-circular cross-sectional shape is hexagonal. In a fifth example of the system, optionally including one or more or each of the first through fourth examples, the spherical flow element and the plurality of passages are symmetric.

The disclosure also provides support for a system, comprising: a transmission, a vent device extending through a housing of the transmission, the vent device comprising a body comprising an upper portion, a middle portion, and a lower portion, wherein the upper portion and the lower portion are cylindrical, and wherein the middle portion comprises a non-circular cross-sectional shape, an interior passage that extends through each of the upper portion, the middle portion, and the lower portion, and a spherical flow element arranged in the interior passage, wherein the spherical flow element receives gases from the interior passages and directs the gases to a cap. In a first example of the system, the spherical flow element comprises a plurality of passages that are angularly arranged and equally spaced relative to one another. In a second example of the system, optionally including the first example, the plurality of passages intersects at a geometric center of the spherical flow element. In a third example of the system, optionally including one or both of the first and second examples, the cap comprises a plurality of snap rings that couple to a lip of the upper portion. In a fourth example of the system, optionally including one or more or each of the first through third examples, the cap comprises a plurality of openings that face radially outward.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a vent device comprising a body that extends through a housing, wherein a spherical flow element is arranged in the body adjacent to a cap through which gases flow, and wherein the spherical flow element comprises a plurality of passages angled 45 and 90 degrees to a central axis of the vent device.

2. The system of claim 1, wherein the body comprises an upper portion, a middle portion, and a lower portion, wherein the upper portion and the lower portion are cylindrical, and wherein the middle portion comprises a hexagonal cross-sectional shape.

3. The system of claim 2, wherein a diameter of the upper portion is greater than a diameter of the lower portion.

4. The system of claim 2, wherein the middle portion is in face-sharing contact with the housing.

5. The system of claim 2, wherein the spherical flow element extends from the middle portion to the cap.

6. The system of claim 1, wherein the plurality of passages intersects at a geometric center of the spherical flow element.

7. The system of claim 1, wherein the housing is a transmission housing.

8. A vent device, comprising:
a cap;
a body comprising an upper portion, a middle portion, and a lower portion, wherein the upper portion and the lower portion are cylindrical, and wherein the middle portion comprises a non-circular cross-sectional shape; and a spherical flow element arranged in the upper portion and the middle portion of the body, the spherical flow element comprising a plurality of passages.

9. The vent device of claim 8, wherein the body comprises an interior passage that extends through each of the upper portion, the middle portion, and the lower portion, and wherein gases flowing through the interior passage are forced to flow through the plurality of passages of the spherical flow element prior to flowing through the cap.

10. The vent device of claim 8, wherein the body is a single piece.

11. The vent device of claim 8, wherein a diameter of the upper portion is greater than a diameter of the lower portion.

12. The vent device of claim 8, wherein the non-circular cross-sectional shape is hexagonal.

13. The vent device of claim 8, wherein the spherical flow element and the plurality of passages are symmetric.

14. A system, comprising:
a transmission;
a vent device extending through a housing of the transmission; the vent device comprising:

a body comprising an upper portion, a middle portion, and a lower portion, wherein the upper portion and the lower portion are cylindrical, and wherein the middle portion comprises a non-circular cross-sectional shape, an interior passage that extends through each of the upper portion, the middle portion, and the lower portion; and a spherical flow element arranged in the interior passage, wherein the spherical flow element receives gases from the interior passage and directs the gases to a cap, and wherein the spherical flow element comprises a plurality of passages that intersect at a geometric center of the spherical flow element.

15. The system of claim 14, wherein the plurality of passages is angularly arranged and equally spaced relative to one another.

16. The system of claim 14, wherein the cap comprises a plurality of snap rings that couple to a lip of the upper portion.

17. The system of claim 14, wherein the cap comprises a plurality of openings that face radially outward.

* * * * *